J. DE MARTINO.
PLANETARY CLUTCH.
APPLICATION FILED JUNE 23, 1919.

1,410,384. Patented Mar. 21, 1922.
5 SHEETS—SHEET 1.

Inventor
Joseph de Martino.
By: Dyrenforth, Lee, Chritton & Wiles
Attys

UNITED STATES PATENT OFFICE.

JOSEPH DE MARTINO, OF CHICAGO, ILLINOIS, ASSIGNOR TO JOHN H. LEE, TRUSTEE, OF CHICAGO, ILLINOIS.

PLANETARY CLUTCH.

1,410,384.   Specification of Letters Patent.   Patented Mar. 21, 1922.

Application filed June 23, 1919. Serial No. 306,065.

*To all whom it may concern:*

Be it known that I, JOSEPH DE MARTINO, a citizen of the United States, residing at Chicago, in the county of Cook and State of Illinois, have invented a new and useful Improvement in Planetary Clutches, of which the following is a specification.

My invention relates to clutches, particularly to planetary clutches, which are adapted to deliver power at a plurality of speed and are especially designed to be used on automobiles either in connection with a transmission or without one. In the latter case of course it would be necessary to add a reversing mechanism as my clutch drives always in the same direction.

An object of this invention is to provide a means for taking power from a driving shaft and delivering it to a driven shaft in such a way that the driven shaft will be driven at the same speed as the drive shaft or at a speed which is at a fixed ratio to that speed.

Other objects will appear from the following specification and these are all accomplished by my invention which is described herein and set forth in the appended claims.

Reference is now had to the drawings in which Figure 1 is a longitudinal section through one form of a clutch embodying my invention;

Figure 1:
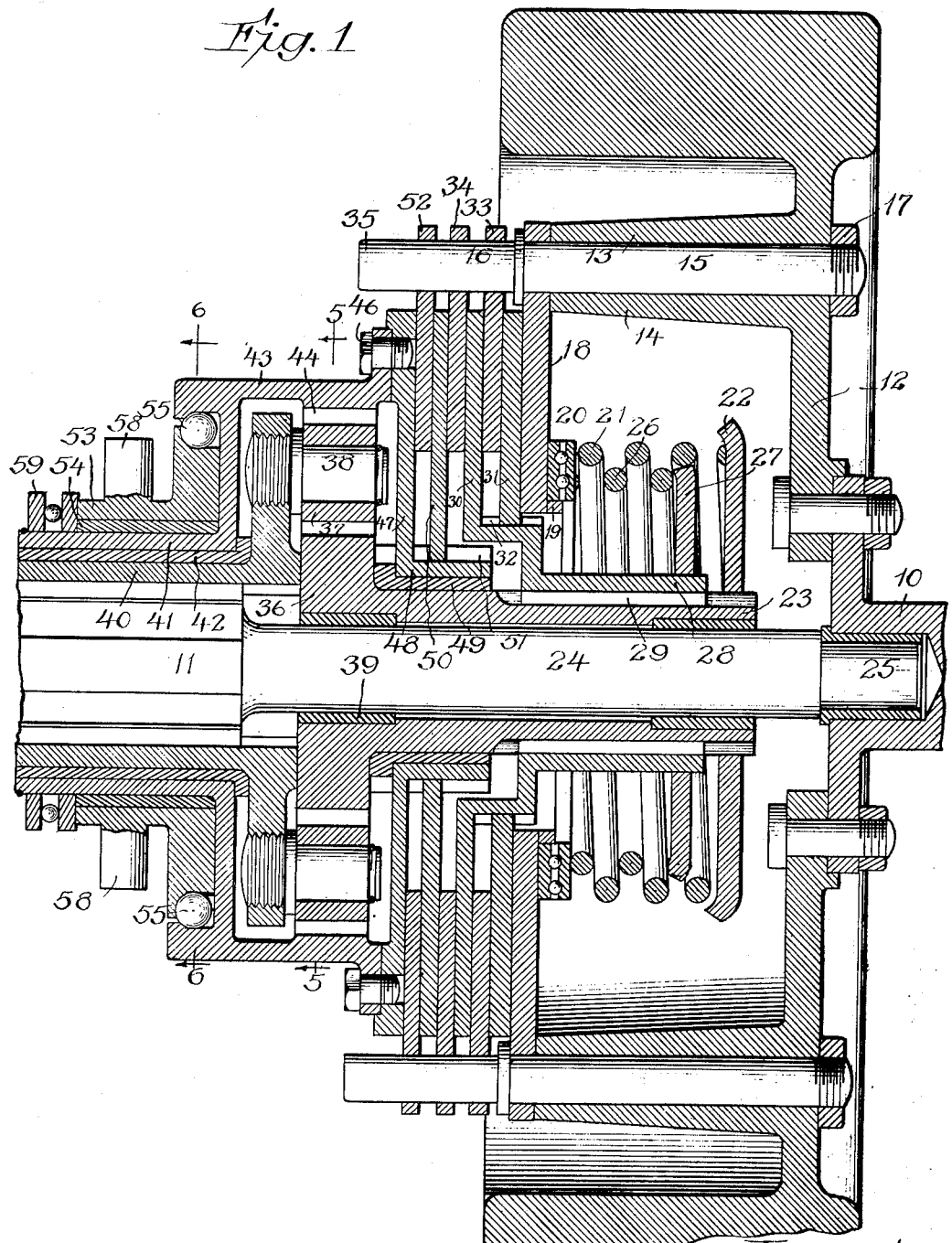

My invention consists primarily in a clutch for transmitting power from a driving shaft 10 to a driven shaft 11. Figure 1 shows an embodiment of my clutch as supplied to a fly-wheel 12 which is secured in any suitable manner to the driving shaft 10. This fly-wheel has formed therein an annular rim 13 having a series of bosses 14 through which pass bolts 15, having shoulder 16 and nut 17 for securing the plate 18 to the face of said annular rim. The inner edge of the plate 18 has an annular rim 19 which is adapted to hold the ball-bearing thrust collar 20. This thrust collar forms a seat for one end of the compression spring 21, the other end of which bears against a plate 22 which is removably secured in any suitable manner to a sleeve 23. This sleeve is journaled and slidable on an extension 24 of the driven shaft 11. A further extension 25 of this shaft may be journaled as shown for the purposes of alignment in the driving shaft 10. The thrust collar 20 also forms a bearing for the compression spring 26, the other end of which bears against a plate 27 which is likewise secured to a sleeve 28 which is slidable endwise on the sleeve 23, but which is prevented from turning by means of keyes or splines 29. The sleeve 28 carries a flat annular extension 30 which forms one of the elements of a disk clutch which as illustrated in this form is a dry disk clutch. Another disk element 31 is also carried on the flange 32 of the sleeve 28. The plate 18 and the disk elements 33 and 34 form the corresponding elements of the disk clutch, the latter being carried on an extension 35 of the bolt 15.

What I have just described is a complete clutch, and it will be observed that the plates 30 and 31 and hence the sleeve 28 will be locked to the fly-wheel by the normal pressure of the spring 26. The releasing means for this clutch as well as the one which is about to be described will be explained latter.

Figure 5:
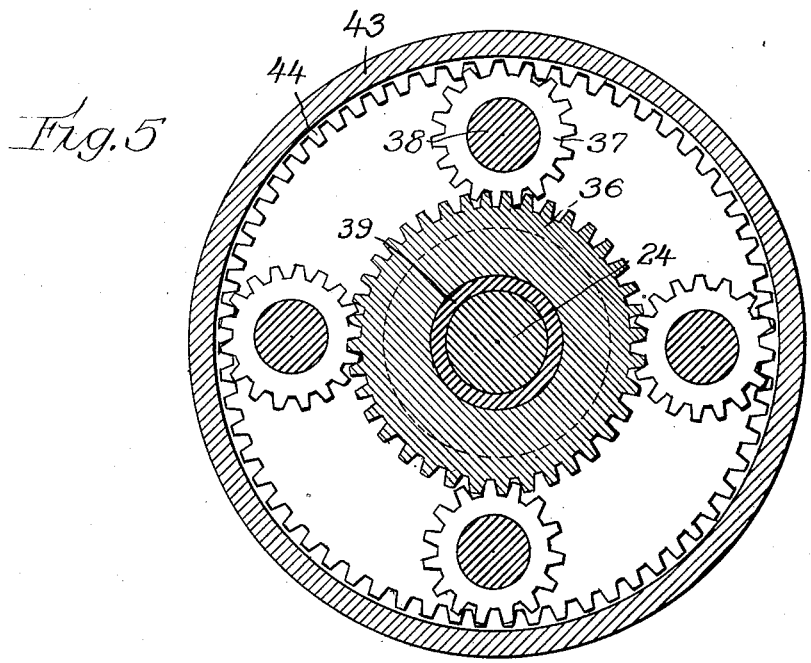
Figure 5 is a section on the line 5—5 of Fig. 1.

The sleeve 23 has an enlarged end which forms the sun gear 36 of the planetary gear system which is shown in Fig. 5. Planet gears 37 are journaled on studs 38 which are carried by the spider 39, which in turn has a sleeved portion 40 which is slidably splined on the driven shaft 11. This sleeve 40 has journaled thereon another sleeved member 41 having a bushing 42 and a housing 43 with an annular gear 44 formed therein. This annular gear meshes with the planet gears 37 and is the orbit of the planetary gear system.

The housing 43 also has a flanged extension 45 which is secured in any suitable manner as by cap screws 46 to a spider 47 of a second disk clutch. This spider has a tubular central portion 48 and a bushing 49 in which is journaled the sleeve 23. The tubular portion 48 also carries one or more disks 50 which are slidable thereon but are prevented from turning thereon by lugs 51.

Between the disk 47 and 50 is interposed the disk 52, which is carried on the extension 35 of the pin 15. The disk 34 is so situated that it forms an element of both disk clutches.

A clutch operating element 53 having a bushing 54, is journaled on the sleeve 41 and carries a single acting clutch consisting preferably of balls 55 which lie in the inclined notches 56 and are pressed by the springs 57. The element 53 also has lugs 58 which engage shifting fingers which are not shown but which act in a well known manner to prevent rotation of the element 53 and to slide it longitudinally of the shaft to engage or disengage the clutch elements. A ball bearing thrust collar 59 is removably secured to the sleeve 41 for taking the thrust of the shifting element 53 which is always applied outward in opposition to the action of the springs 21 and 26. It is apparent that by increasing the number of loose disks the multiple disk clutch may be expanded as far as desired.

The operation of this clutch is as follows:—As shown the two disk clutches are normally held in engagement by the springs 21 and 26. When, however, it is desired to drive the driven shaft 11 at a slower speed than that of the driving shaft 10, the clutch shifting element is forced outward away from the fly-wheel carrying with it the spider 39, the planet gears 37, the plate 47 and the sun gear 36 and sleeve 23 compressing the spring 21.

Figure 6:
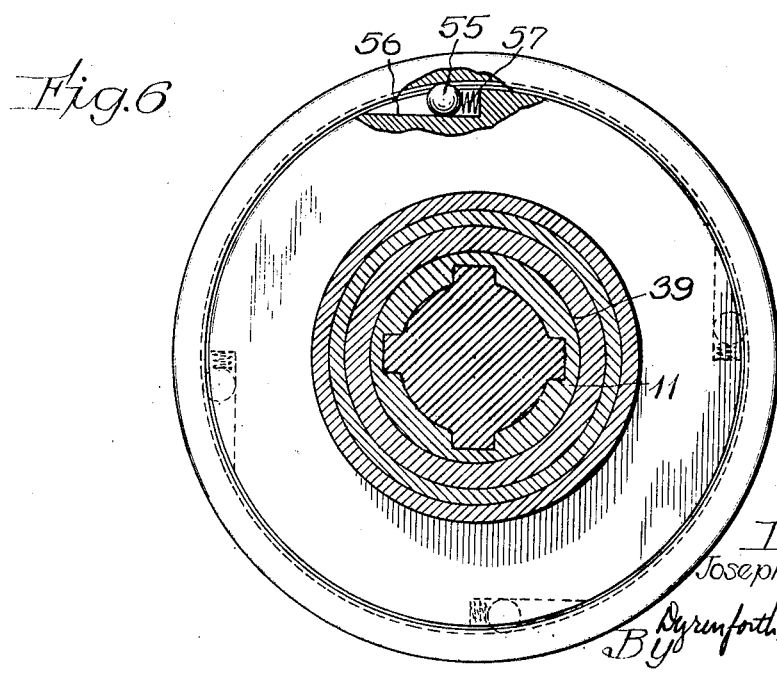
Figure 6 is a section on the line 6—6 of Fig. 1.

When held in this position and before the plate 22 comes in contact with the sleeve 28, the disk clutch elements 47 and 50 will be disengaged, and the housing 43 which normally rotates in a clockwise direction as shown in Figure 6, now tends to turn in the reverse direction. This action is due to the fact that the load on the driven shaft 11 tends to hold it stationary, the planet gears 37 then acting as idlers tend to turn the internal gear 44 in the opposite direction to the sun 36 which is always driven in a clockwise direction, when at all, by the clutch disk 30 acting through the splines 29.

The tendency for the housing 43 to reverse is prevented by the action of the balls 55 which permit motion in one direction but prevent it in the other. With the internal gear 44 held, the planets 37 must move and the shaft 11 is driven in the same direction as the shaft 10 but at a reduced speed depending upon the relative sizes of the gears.

When, however, the shift element 53 is moved outward still further, the plate 22 strikes the end of the sleeve 28 forcing the clutch disks 30 and 31 out of engagement with the disks 18 and 33 and the clutches entirely disconnect the shafts 10 and 11.

Figure 2:
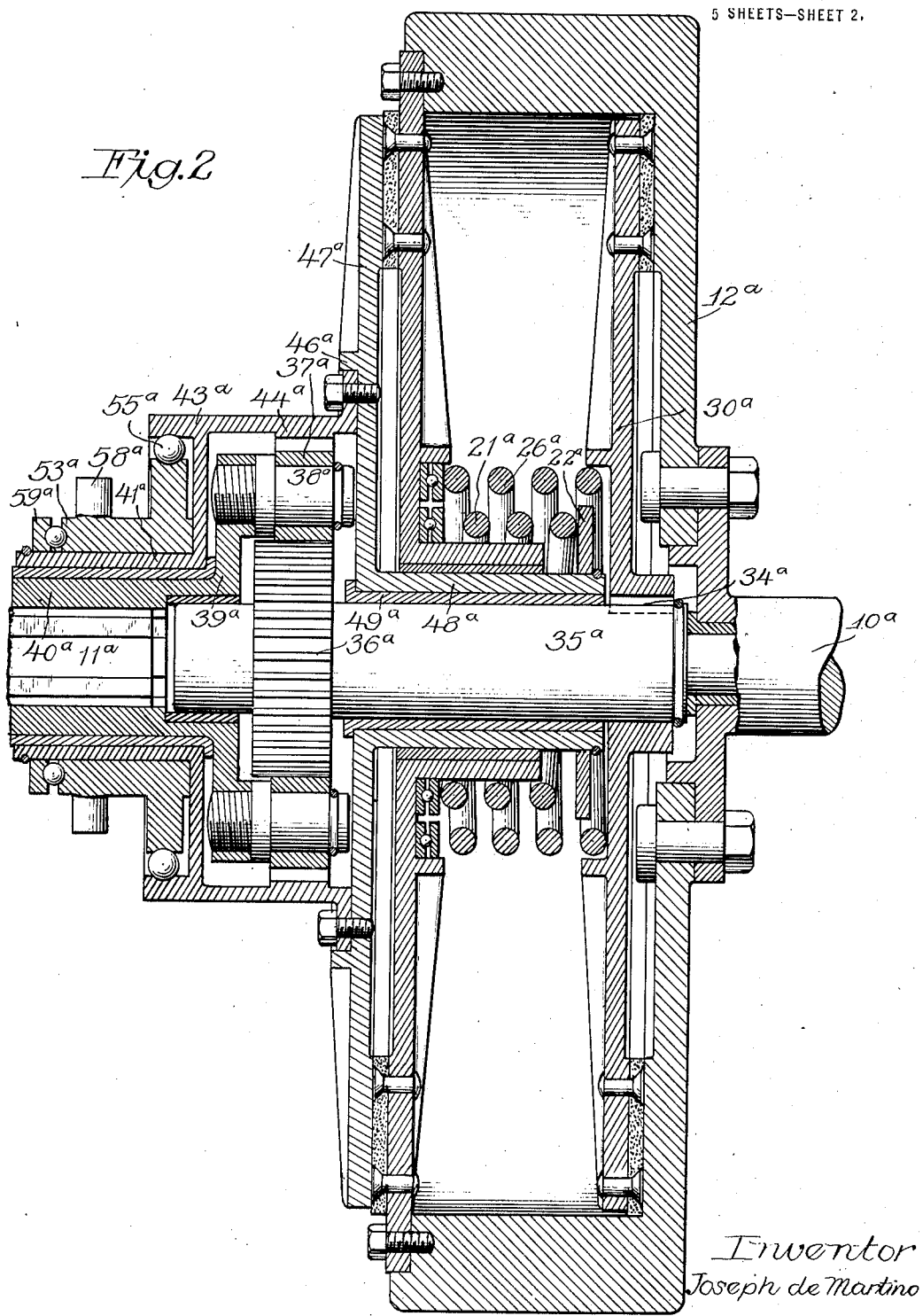
Figures 2, 3 and 4 are similar views of other modifications.

In Figure 2, I have shown a modification having two single disk clutches in which one of the disk clutches is contained entirely within the fly-wheel while the other is on the outside as in the form shown in Figure 1. The construction and operation of the two clutches are quite similar.

As the clutch operating element 53$^a$ is moved away from the fly-wheel, the housing 43$^a$ and the disk 47$^a$ are retracted against the action of the spring 21$^a$ thereby disengaging the clutch disk 47$^a$. The internal gear 44$^a$ as previously explained tends to run backward but is held by the balls 55$^a$ and motion is transmitted through the planet gears 37$^a$ to the spider 39$^a$ and thence to the driven shaft 11$^a$. This shaft is then driven at a reduced speed.

The gear 36$^a$ has a short shaft extending at both ends and slidably journaled in the shafts 10$^a$ and 11$^a$. This shaft 35$^a$ has keyed thereto at 34$^a$ a disk clutch element 30$^a$. As the clutch operating element 53$^a$ is further withdrawn, the shoulder on the bushing 49$^a$ in the sleeve 48$^a$ strikes the side of the sun gear 36$^a$. That gear and the clutch element 30$^a$ are moved away from the fly-wheel and the clutches are both disengaged, and the shaft 11$^a$ stops.

Figure 3:
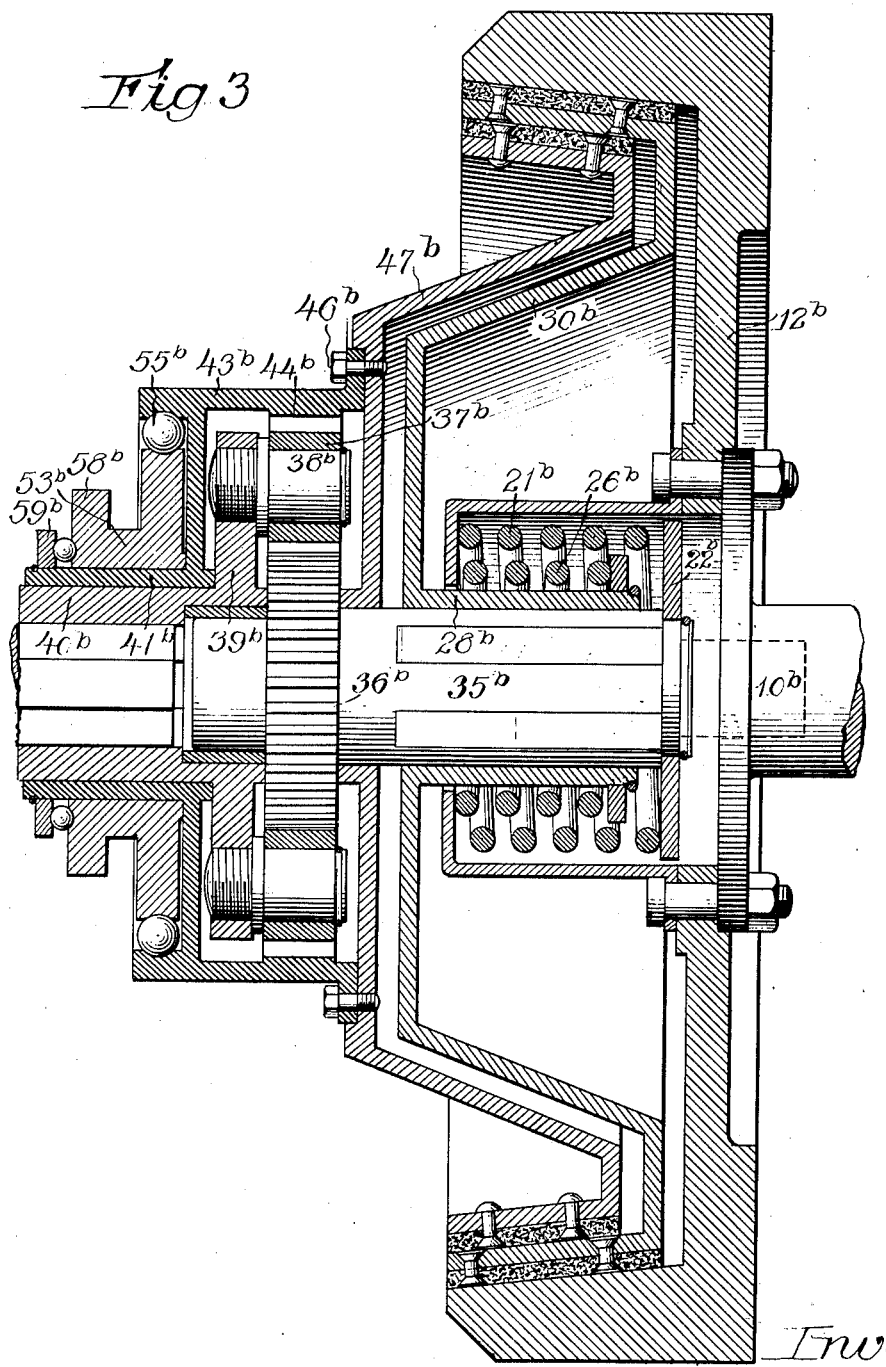

In Figure 3, I have illustrated my invention as applied to a cone clutch. It is quite similar to the construction shown in Figure 2 so that an extensive description of this figure seems unnecessary.

As the housing 43$^b$ is drawn back, however, it disengages the clutch element 47$^b$ from the other clutch element 30$^b$, and all the gears of the planetary system move outward together owing to an extension of the clutch element 47$^b$ which bears against the side of the sun gear 36$^b$.

The clutch element 30$^b$ has a sleeved extension 28$^b$ which is splined on the short gear shaft 35$^b$. As this gear shaft is moved outwardly against the action of the spring 21$^b$, it first disengages the clutch element 47$^b$, and the planetary gears drive the shaft 11$^b$ at reduced speed substantially as in the construction shown in Figure 2. When the plate 22$^b$ strikes the end of the sleeve 28$^b$ as the clutch shifting element 53$^b$ is further moved, the clutch element 30$^b$ will be withdrawn against the action of the spring 26$^b$, and both clutch elements are disengaged.

Figure 4:
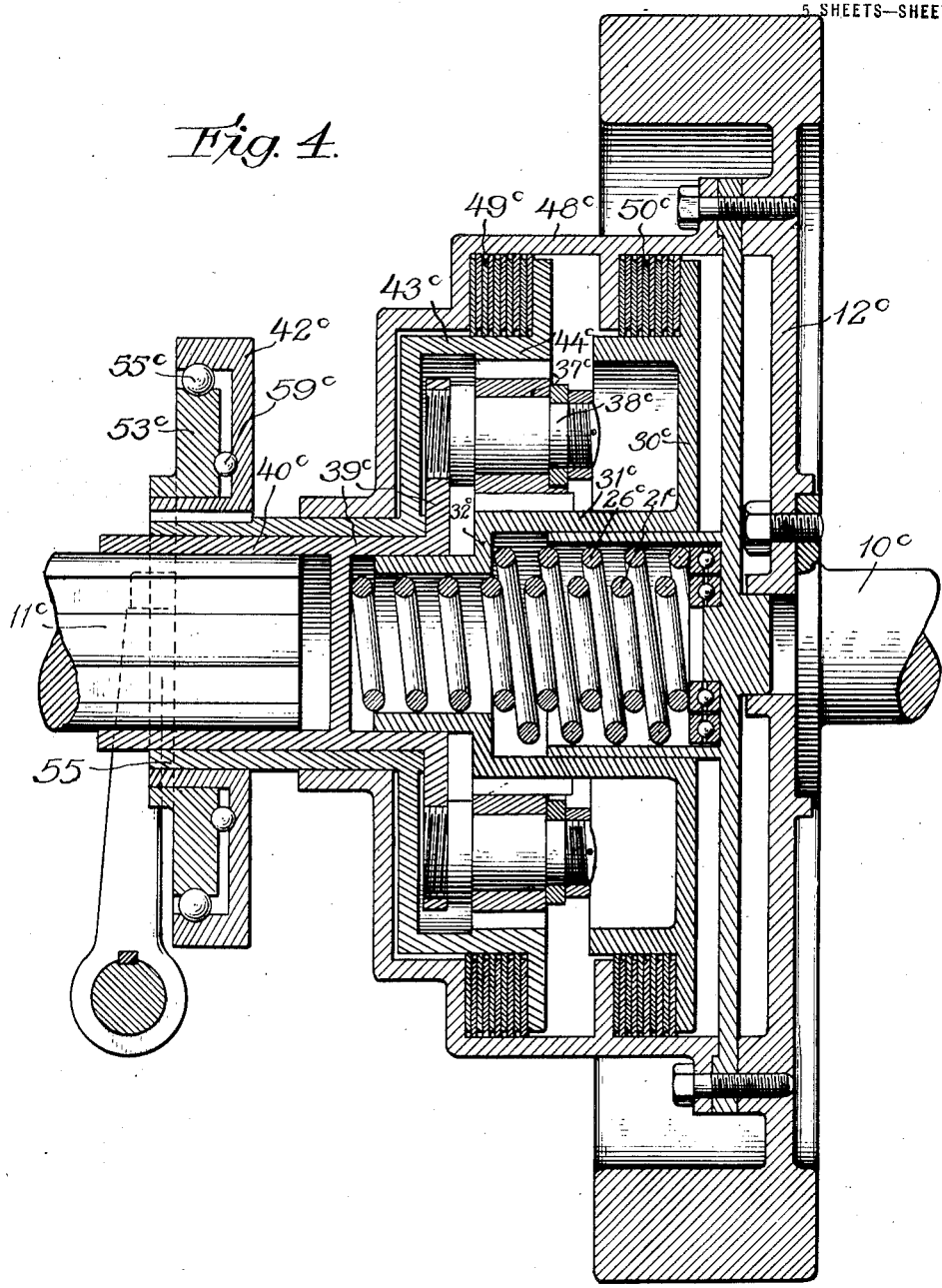

In Figure 4 I have shown another modification employing multiple disk clutches, wherein the clutches themselves and the planetary gears are entirely enclosed and hence can run in oil if desired.

Unlike the forms shown in Figures 1, 2 and 3 in which the clutch is disengaged by moving the clutch shifting element away from the fly-wheel, this clutch is disengaged by forcing the clutch shifting element 53$^c$ toward the fly-wheel. This element as in the other forms is held from turning and as here shown is operable by a lever 52$^c$.

When the shifting element 53$^c$ is forced in, the thrust is taken by the ball bearing 59$^c$ and delivered through the housing 42$^c$ to the sleeve 41$^c$ and clutch spider 43$^c$. The latter has keyed thereto in any well known manner alternate disks of a multiple disk clutch, the intervening disks being similarly carried by the main housing 48°, which is bolted or otherwise secured to the fly-wheel. On the inner circumference of the spider 43° is an annular gear 44° meshing with the planet gears 37° which are carried by the spider 39° which terminates in a sleeve 40° which is keyed or splined to the drive shaft 11°.

The housing 48° also carries a multiple disk 50° the alternate disks of which are held by the spider 30° which has a sleeve 31° carrying a sun gear 36° and a shoulder 32°.

It will therefore be apparent that as the sleeve 41° is forced in, the disk clutch 49° will first be disengaged. The clutch 50° will then drive the shaft 11° through the spider 30° the sun gear 36°, the planet gear 37°, the spider 39° and the splined sleeve 40°. The shaft 11° will then be driven at a reduced speed. On a further motion of the sleeve 40° it will strike the shoulder 32° causing the clutch 50° to be disengaged and the driving connection between shafts 10° and 11° to be broken. The action of the ball clutch 55° and of the springs 21° and 26° is substantially the same as in the other figures.

In all the modifications the action of the clutches in engaging is a reversal of the order of operations by which they are disengaged.

While I have shown and described but a few embodiments of my invention, it is to be understood that it is capable of many modifications. Changes therefore in the construction and arrangement may be made without departing from the spirit and scope of the invention as disclosed in the appended claims.

What I claim as new and desire to secure by Letters Patent is:

1. In a mechanism of the class set forth, a fly wheel and a driven member, two clutch elements adapted to be successively operatively connected to the fly wheel, a planetary gear system comprising an annular gear, planet gears, and a sun gear, the annular gear being connected to one of said clutch units, the sun gear to the other of said clutch elements, and the planet gears to the driven member an overrunning clutch operatively connected to the annular gear and a stationary member against which said overrunning clutch reacts whereby said gear may be driven in one direction but is prevented from turning in the opposite direction.

2. In a mechanism of the class set forth, a fly wheel and a driven member, two clutch elements adapted to be successively operatively connected to the fly wheel, a planetary gear system comprising an annular gear, planet gears, and a sun gear, the annular gear being connected to that clutch element which is first disengaged from the fly wheel, the sun gear to the other of said clutch elements and the planet gears to the driven member an overrunning clutch operatively connected to the annular gear, and a stationary member against which said overrunning clutch reacts.

3. In a mechanism of the class set forth, a fly wheel and a driven member, two clutch elements adapted to be successively operatively connected to the fly wheel, a planetary gear system comprising an annular gear, planet gears and a sun gear, one of said gears being connected to the driven member, another gear being connected to one of said clutch elements and the other gear connected to the other clutch element and means for holding against rotation that clutch unit which is first disconnected from the fly wheel.

4. In a mechanism of the class set forth, a fly wheel and a driven member, two clutch elements adapted to be successively operatively connected to the fly wheel, a planetary gear system comprising an annular gear, planet gears and a sun gear, one of said gears being connected to the driven member, another gear being connected to one of said clutch elements and the other gear connected to the other clutch element, means for holding against rotation that clutch element which is first disconnected from the fly wheel and a single means for operating both of said clutches.

JOSEPH DE MARTINO.